United States Patent
Hébert et al.

(10) Patent No.: US 11,582,034 B2
(45) Date of Patent: Feb. 14, 2023

(54) SECURE, DECENTRALIZED, AUTOMATED PLATFORM AND MULTI-ACTORS FOR OBJECT IDENTITY MANAGEMENT THROUGH THE USE OF A BLOCK CHAIN TECHNOLOGY

(71) Applicant: BULL SAS, Les Clayes-sous-Bois (FR)

(72) Inventors: Guillaume Hébert, Lyons (FR); David Leporini, Rungis (FR)

(73) Assignee: BULL SAS

( * ) Notice: Subject to any disclaimer, the term of this patent is extended or adjusted under 35 U.S.C. 154(b) by 67 days.

(21) Appl. No.: 17/122,383

(22) Filed: Dec. 15, 2020

(65) Prior Publication Data
US 2021/0184845 A1 Jun. 17, 2021

(30) Foreign Application Priority Data
Dec. 16, 2019 (FR) ...................................... 1914486

(51) Int. Cl.
*H04L 9/00* (2022.01)
*H04L 9/32* (2006.01)
(Continued)

(52) U.S. Cl.
CPC ........ *H04L 9/0861* (2013.01); *G06F 16/2379* (2019.01); *H04L 9/30* (2013.01); *H04L 9/3218* (2013.01); *H04L 9/50* (2022.05)

(58) Field of Classification Search
CPC ....... H04L 9/0861; H04L 9/30; H04L 9/3218; H04L 9/50; G06F 16/2379
See application file for complete search history.

(56) References Cited

U.S. PATENT DOCUMENTS 10,673,617 B1 * 6/2020 Antoniou ............ G06F 13/4282
11,063,760 B2 * 7/2021 Subba ..................... H04L 9/085
(Continued)

FOREIGN PATENT DOCUMENTS

WO WO-2020044211 A1 * 3/2020 ............. G06Q 10/06

OTHER PUBLICATIONS

Search Report and Written Opinion issued in FR1914486, dated Aug. 28, 2020 (9 pages).
(Continued)

*Primary Examiner* — Darshan I Dhruv
(74) *Attorney, Agent, or Firm* — Arc IP Law, PC; Joseph J. Mayo (57) ABSTRACT

Secure management of keys and identities of an object manufactured by a manufacturer having a manufacturer key pair, and a client having a client key pair, the management being carried out using a decentralized blockchain database. The method includes generation of a manufacturing key pair; and publication and recording, in the blockchain, of the decentralized object identifier used to obtain the public key of the object. When a client purchases the object from the manufacturer, the method includes providing, by the object manufacturer, the object identifier, and the public manufacturing key to the client; and updating the blockchain. When the object is switched on for the first time, the object enrolls itself by generation of a utilization key pair; auto-enrollment using the manufacturing key pair; and replacement, in the blockchain, of the public manufacturing key associated with the object identifier with the public utilization key associated with the object identifier.

15 Claims, 4 Drawing Sheets

(51) Int. Cl.
*H04L 9/30* (2006.01)
*H04L 9/08* (2006.01)
*G06F 16/23* (2019.01)

(56) References Cited

U.S. PATENT DOCUMENTS

| | | | |
|---|---|---|---|
| 11,074,650 B1 * | 7/2021 | Madisetti | G06Q 20/3823 |
| 2016/0366102 A1 * | 12/2016 | Smith | H04L 9/0841 |
| 2018/0097635 A1 * | 4/2018 | Moses | H04L 9/3236 |
| 2019/0163912 A1 * | 5/2019 | Kumar | G06F 16/27 |
| 2019/0222424 A1 * | 7/2019 | Lindemann | H04L 9/3231 |
| 2019/0349346 A1 * | 11/2019 | Curtis | H04W 12/084 |
| 2020/0293663 A1 * | 9/2020 | Mugundan | H04W 4/70 |
| 2021/0091960 A1 * | 3/2021 | Werner | H04L 9/50 |
| 2021/0110004 A1 * | 4/2021 | Ross | H04L 63/0823 |
| 2021/0158372 A1 * | 5/2021 | Dittmann | G06F 21/44 |

OTHER PUBLICATIONS

Search Report and Written Opinion issued in EP20214774, dated May 3, 2021 (9 pages).

Won, et al., "Decentralized Public Key Infrastructure for Internet of Things", Milcom 2018—2018 IEEE Military Communications Conference, IEEE, Oct. 29, 2018 (7 pages).

\* cited by examiner

SECURE, DECENTRALIZED, AUTOMATED PLATFORM AND MULTI-ACTORS FOR OBJECT IDENTITY MANAGEMENT THROUGH THE USE OF A BLOCK CHAIN TECHNOLOGY

TECHNICAL FIELD OF THE INVENTION

The present invention generally relates to the field of Identity and Access Management, and more particularly to secure automated access by objects to digital services and the protection of the ensuing exchanges.

PRIOR ART

We are currently witnessing immense growth of the Internet of Things (IoT) and the securing of these things (objects). One estimate of the market gives 30 billion as the number of objects connected to the IoT by 2020. This is why it is important to find IoT solutions that meet scalability requirements in order to respond to demand, but also to security aspects, in order to be protected against cyberattacks. The security requirements associated with the communication of the objects (confidentiality, integrity, authentication and non-repudiation) are covered by the use of cryptographic mechanisms which are based on sets of keys and digital identities. This key and identity manager thus represents the core of the security of the system. From the perspective of the objects, it is due to this manager that the object is authorized to transmit on a network and to access an application service (identification and authentication of the object), that it is able to transmit encrypted, integral and authenticated messages and that it is capable of decrypting the data received (symmetric/asymmetric cryptography).

The secure automated access by objects to digital services, and the protection of the ensuing exchanges require establishing enrollment processes both for the manufacturers of objects and for the objects themselves, as well as linking them up with the digital services in question ("service on-boarding").

These processes must respond to issues such as the identification of the objects with a list of associated attributes (including in particular security identifiers such as cryptographic keys) and the storage thereof in a repository of the Manufacturer of the objects; transferring the ownership and/or operating rights of an object from a Manufacturer to a user of the object (for example a service provider using the object); transferring the ownership and/or operating rights from one user to another (a case, for example, of the need for reversibility); updating the attributes associated with the identity of the object by the owner of an object and/or the entity in charge of its operating rights.

Moreover, the platforms which respond to these processes must demonstrate a high degree of fault resilience, high availability and strong security.

With the rise in connected objects (IoT), in particular small and inexpensive IoT objects, new constraints specific to these objects are emerging, such as small memory size, low computing power, low consumption and a possible offline mode or disconnection of the object.

In addition to all these technical constraints there are increasing legal constraints, such as new regulations in force regarding data ownership (GDPR) and Privacy by Design (PbD).

There are currently several solutions to respond to these issues, for example IAM solutions (Identity and Access Management). Numerous cybersecurity companies offer such solutions: Active Directory, IBM Security Identity and Access Assurance, Oracle Identity Cloud Service, Okta, Centrify, RSA SecurID Access, Keeper Security, SailPoint, OneLogin, Ping, etc. Nonetheless, the various stakeholders in this list offer centralized solutions with internal data storage which may be of a personal nature, therefore sensitive, and thus may no longer comply with GDPR regulations.

These solutions generally propose a centralized technical process, usually managed by the service provider, which does not enable automation, and prior bilateral agreements between the service providers and the object manufacturers, necessary to enable the linking up of the objects to the provider's services.

The object is already recorded and "paired with its Manufacturer/Owner".

DISCLOSURE OF THE INVENTION

The object of the present invention is therefore to propose a communication method for the secure management of keys and identities, making it possible to overcome at least some of the disadvantages of the prior art.

This aim is achieved by a communication method for the secure management of keys and identities of an Object manufactured by a Manufacturer having a Manufacturer key pair of public key Kp, and private or secret key Ks ($Ks_{man}$, $Kp_{man}$), and a client having a Client key pair ($Ks_{client}$, $Kp_{client}$), characterized in that the management is carried out at least partially on a decentralized blockchain database, and that the method comprises the following steps:

a) Generation, by the Manufacturer, of a manufacturing key pair ($Ks_{fab}$, $Kp_{fab}$) obtained via a key derivation function, the manufacturing key pair being recorded in the object, and composed of a private manufacturing key ($Ks_{fab}$) resulting from the derivation of the private Manufacturer key ($Ks_{man}$) with a diversifier (DIV), and of a public manufacturing key ($Kp_{fab}$), complementary to said private key ($Ks_{fab}$), the public key ($Kp_{fab}$) resulting from the derivation of the public Manufacturer key ($Kp_{man}$) with the same diversifier (DIV).

b) Publication and recording, in the blockchain, of the decentralized identifier (DID) of the object and preferentially of the diversifier (DIV) used to obtain the public key $Kp_{fab}$ of the object: DID-DIV association.

And, when a Client purchases the object from said Manufacturer, the method comprises the following initialization steps:

c) Providing, by the Manufacturer of the object, of the identifier of the object DID, and of the public manufacturing key $Kp_{fab}$ to the client, d) updating the blockchain by publication of the public client key $Kp_{client}$ and creation of the association, in said database, between the DID and the DIV and $Kp_{client}$ And, when the object is switched on for the first time, the object enrolls itself according to the following steps:

e) Generation of an utilization key pair ($Ks_{util}$, $Kp_{util}$), the generation preferably being carried out from an unknown generated by the object itself.

f) Auto-enrollment using the manufacturing Key pair by publication, by the object, of its public utilization key ($Kp_{util}$) in an enrollment message, and signing the enrollment message with the private manufacturing key ($Ks_{fab}$)

g) Replacing, in the blockchain, the public manufacturing key associated with the DID of the object with the public utilization key associated with the DID of the object.

According to one particular feature, the key pair generator is based on Hierarchical Key Wallets to provide unique manufacturing key pairs which are diversified from the Manufacturer key pair.

According to another particular feature, the object is transferred from one owner to another by reiterating steps d to g.

According to another particular feature, the method further comprises a step prior to the generation of the manufacturing key pairs by the Manufacturer, wherein said Manufacturer records their Manufacturer identifier in the blockchain database and publishes their public Manufacturer key ($Kp_{man}$) by associating it with the Manufacturer identifier.

According to another particular feature, sharing or managing the rights of the object is performed by the owner of the object by means of Verifiable Credentials, preferentially requested by the Service Providers and validated by the owner.

According to another particular feature, a Zero Knowledge Proof (ZKP) system is established within a Smart Contract, in order to give information without revealing the values thereof.

The present invention also relates to a system for managing secure identities based on a blockchain able to carry out the steps of a process performing:
  The identification of the objects with a list of associated attributes, including in particular security identifiers such as cryptographic keys, and recording thereof in a repository of the Manufacturer;
  The transfer of ownership and/or operating rights of an object from a Manufacturer to a user of the object, for example a service provider using the object, by recording new identities associated with the object;
  The transfer of ownership and/or operating rights from one user to another, by recording new identities associated with the object;
  The updating of attributes associated with the identity of the object by the owner of an object and/or the entity in charge of its operating rights.

The present invention also relates to a database, used by the system for managing secure identities based on a blockchain, implemented on a secure, decentralized, automated and multi-stakeholder platform for object identity management through the use of blockchain technology implemented on several nodes of the system with which the platform communicates, the nodes being responsible for maintaining the blockchain and enabling the stakeholders (and the objects) to look up the state of this chain and to interact with this chain via a common shared repository (or register), each node having access to a cryptographic module which is preferably physical, in charge of the secure storage of its private key and of the access to the shared register, characterized in that the database constitutes a repository for each manufacturer containing a list of associated attributes, including in particular security identifiers such as cryptographic keys, and either carrying out the recording thereof in the repository of the Manufacturer or carrying out the update of the attributes associated with the identity of the object by the owner of an object and/or the entity in charge of its operating rights.

The present invention also relates to a secure, decentralized, automated and multi-stakeholder platform for object identity management using a database, characterized in that it manages:
  The transfer of ownership and/or operating rights of an object;
  The recording of proof of object possession in the shared repository;
  The activation/reactivation of objects;
According to one particular feature, the blockchain technology used does not have to be of a specific type and comprises at least:
  a permission system for identifying and strongly authenticating a stakeholder;
  an access control system based on the identities of the users;
  an anti-replay mechanism,
Each node maintaining the blockchain having to be located in a secure environment, and the public identity of each node has to be made available to the other nodes and stakeholders within the shared register; the execution of Smart Contract and functions on the blockchain being performed in this secure environment, the ultimate aim of the recording being to create a link, accessible by everyone in the blockchain, in order to make it possible to match the stakeholder and their digital identity by a key pair, public key and private key, or by a certificate, optionally signed by a certified identity management body.

The present invention also relates to a system for managing secure identities based on a blockchain and able to carry out the steps of a communication method for the secure management of keys and identities, the system comprising at least:
A Manufacturer, using a key diversification system based on diversifiers generated by a diversifier generator, a system for connecting to a blockchain, a system for attributing an identifier to each object leaving manufacturing, and a hardware and software arrangement in order to send, to the blockchain server, a message of publication and of recording of the public client key $Kp_{client}$ and of the association in said database between the DID and the DIV.

The present invention also relates to a system for managing secure identities based on a blockchain and able to carry out the steps of a communication method for the secure management of keys and identities, the system comprising at least:
  An object provided with computation means and means for storing in memory a program and sufficient data to carry out the following operations: when the object is switched on for the first time, the object enrolls itself according to the following steps:
  Generation of an utilization key pair ($Ks_{util}$, $Kp_{util}$), the generation preferably being carried out from an unknown,
  Auto-enrollment using the manufacturing Key pair by publication, by the object, of its public utilization key ($Kp_{util}$) in an enrollment message, and signing the enrollment message with the private manufacturing key ($Ks_{fab}$)
  Replacement, in the blockchain, of the public manufacturing key with the public utilization key The present invention also relates to an identity management system of an identity (ID) service provider, implementing a blockchain and using the objects recorded on a network to fulfill application services (AS) wherein the information provided by the objects are used, each node of the network of the identity service provider has access to a cryptographic module responsible for the secure storage of the private key of said node, the nodes having clients referred to as Stakeholders, each having their own identity $ID_{act}$ recorded in the blockchain, each object manufacturer is recorded in the blockchain of the identity service provider and the public manufacturing keys of the manufacturers are known to everybody; for each object sold or transferred, each manufacturer provides the identifier of the object and a diversifier used by the manufacturer (DID, DIV) for the calculation of the manufacturing key pairs of each object by the manufacturer, and only the identifier of the object and the public manufacturing key are published in the blockchain, only the private manufacturing key remains stored outside of the chain, in this instance in the object;

Each object being provided with computation means and means for storing in memory a program and sufficient data to execute the following operations: when the object is switched on for the first time, the object enrolls itself with the identity service provider by carrying out the following steps:

Generation, in the object, of an utilization key pair ($Ks_{util}$, $Kp_{util}$), the generation preferably being carried out from an unknown generated by the object itself.

Auto-enrollment using the utilization Key pair by publication, by the object, of its public utilization key ($Kp_{util}$), and signing the transaction with the private manufacturing key ($Ks_{fab}$)

Replacement of the public manufacturing key with the public utilization key by updating the blockchain.

The present invention also relates to an object provided with computation means and means for storing in memory a program and sufficient data to carry out the following operations: when the object is switched on for the first time, the object enrolls itself according to the following steps:

Generation of an utilization key pair ($Ks_{util}$, $Kp_{util}$), the generation preferably being carried out from an unknown generated by the object itself.

Auto-enrollment using the manufacturing Key pair by publication, by the object, of its public utilization key ($Kp_{util}$) in an enrollment message, and signing the enrollment message with the private manufacturing key ($Ks_{fab}$)

Replacement of the public manufacturing key with the public utilization key by updating the blockchain.

BRIEF DESCRIPTION OF THE FIGURES

Other features, details and advantages of the invention will emerge from reading the following description, with reference to the appended figures, wherein.

DETAILED DESCRIPTION OF THE INVENTION

Numerous combinations can be contemplated without departing from the scope of the invention: the person skilled in the art will choose one or the other based on economic, ergonomic or size constraints or other constraints they have to comply with.

Generally, the present invention comprises a communication method for the secure management of keys and identities of an Object manufactured by a Manufacturer having a Manufacturer key pair of public key Kp, and private or secret key Ks ($Ks_{man}$, $Kp_{man}$), and a client having a Client key pair ($Ks_{client}$, $Kp_{client}$), characterized in that the management is carried out at least partially on a decentralized blockchain database, and that the method comprises the following steps:

a) Generation, by the Manufacturer, of a manufacturing key pair ($Ks_{fab}$, $Kp_{fab}$) obtained via a key derivation function, the manufacturing key pair being recorded in the object, and composed of a private manufacturing key ($Ks_{fab}$) resulting from the derivation of the private Manufacturer key ($Ks_{man}$) with a diversifier (DIV), and of a public manufacturing key ($Kp_{fab}$), complementary to said private key ($Ks_{fab}$), the public key ($Kp_{fab}$) resulting from the derivation of the public Manufacturer key ($Kp_{man}$) with the same diversifier (DIV).

b) Publication and recording, in the blockchain, of the decentralized identifier (DID) of the object and preferentially of the diversifier (DIV) used to obtain the public key $Kp_{fab}$ of the object: DID-DIV association.

And, when a Client purchases the object from said Manufacturer, the method comprises the following initialization steps:

c) Providing, by the Manufacturer of the object, of the identifier of the object DID, and of the public manufacturing key $Kp_{fab}$ to the client, d) updating the blockchain by publication of the public client key $Kp_{client}$ and creation of the association, in said database, between the DID and the DIV and $Kp_{client}$ And, when the object is switched on for the first time, the object enrolls itself according to the following steps:

e) Generation of an utilization key pair ($Ks_{util}$, $Kp_{util}$), the generation preferably being carried out from an unknown generated by the object itself.

f) Auto-enrollment using the manufacturing Key pair by publication, by the object, of its public utilization key ($Kp_{util}$) in an enrollment message, and signing the enrollment message with the private manufacturing key ($Ks_{fab}$)

g) Replacement, in the blockchain, of the public manufacturing key associated with the DID of the object with the public utilization key associated with the DID of the object.

The enrollment is made possible since the object has knowledge of the access point of its manufacturer (IP address and/or gateway, etc.) and is in possession of the Kfab key pair (in particular the private key).

In some embodiments, each publication in the blockchain is equivalent to at least one transaction in same The diversifier DIV could be not published in the Blockchain, but for security reasons it is. Indeed, this enables the Manufacturer to not store the manufacturing Key pair, and to thus be obliged to recalculate it if needed.

There is a relationship which makes it possible to associate the DID and the DIV. Thus, any stakeholder is capable of finding the DIV if they know the DID. The DIV is necessary as it enables the manufacturer to recalculate the key: DIV for diversifier. A diversified key is obtained from a key and a diversifier: the key is known to the manufacturer and the diversifier is stored in the blockchain.

Advantageously, the object is capable of enrolling itself and signs the enrollment message with the manufacturing key ($Ks_{fab}$), which it is the only one to have.

Advantageously, the replacement in the blockchain is carried out by updating the blockchain via a transaction. The blockchain is like a status register: updating the status of a value, therefore replacement via a transaction. The old status is kept (blockchain paradigm) but is no longer up to date.

Decentralized "blockchain" database is understood to be a decentralized database comprising a network of chains of blocks, with nodes comprising all or part of the blockchain register. Advantageously, in order to keep track of all the transactions, the blockchain network uses the multi-chain register which is replicated on all the homologous nodes of the blockchain network. The blockchain is a list of blocks each containing several transactions. Each block has a pointer to the previous block and the contents of the blocks are protected by hash signatures. The bitcoin operating nodes build new blocks from incoming transactions. This building is made difficult to carry out and requires considerable mining calculations, proof of work. The effort expended also makes it just as difficult to change blocks already included in the blockchain, all the more so since changing a block in the middle of the chain would require recreating all the following blocks. Thus, the blockchain register is well protected from modifications and can be considered to be a permanent record of the transactions. In order to encourage mining effort, miners are remunerated with the bitcoins newly created when a block is created. They also receive all the transaction fees of the transactions included in the new block.

Blockchain technology is used as a shared and distributed repository of identities including a list of associated public attributes. These identities may, by way of illustration, use the format DID defined in the specification, "Decentralized Identifiers (DIDs)"

The system is preferentially not based on a public blockchain, and not on a blockchain with proof of work, which requires computing power and energy in the case of IoT usage (since some objects have low-consumption and low computing power constraints). On the contrary, the solution is preferentially based on a consortium blockchain/company blockchain/permission blockchain/POK (Proof of Knowledge) blockchain.

The invention relates to a secure, decentralized, automated and multi-stakeholder platform for object identity management through the use of a blockchain technology. In other words, on a blockchain system, in order to benefit from its advantages: scalability, replication, resilience to faults/attacks, while adding an additional layer for the IAM and the GIA connected to the identity of the entities.

These embodiments therefore do not require additional stakeholders or additional servers, only the direct stakeholders (Manufacturer, Client, Object) of a decentralized blockchain database, and potentially a service provider. Advantageously, the nodes of the blockchain are only used to store data and update it via transactions carried out on said blockchain.

Some solutions provide for the presence of a DM (Device Manager), while in the present system, the recording has already been carried out and the enrollment on the network is initiated by the object. The object autonomous by virtue of the DID.

In some embodiments, the supplying of data, in particular of the identifier of the object DID and of the public manufacturing key $Kp_{fab}$, to the client, is carried out by an "off-chain" transmission.

"Off-chain" supplying or sending of data is understood as supplying or sending data by a mechanism outside the blockchain, in order to improve the security and confidentiality of particularly sensitive data. This means, for example, secure sending by mail, making available on a secure storage server, sending a USB stick with secure data, or else other possible means conceivable to a person skilled in the art which respond to the stated issue.

In some embodiments, the key pair generator is based on Hierarchical Key Wallets to provide unique manufacturing key pairs which are diversified from the Manufacturer key pair.

In some embodiments, the object is transferred from one owner to another by reiterating steps d to g.

In some embodiments, the method further comprises a step prior to the generation of the manufacturing key pairs by the Manufacturer, wherein said Manufacturer records their Manufacturer identifier in the blockchain database and publishes their public Manufacturer key ($Kp_{man}$) by associating it with the Manufacturer identifier.

In some embodiments, sharing or managing the rights to the object is performed by the owner of the object by means of Verifiable Credentials, preferentially requested by the Service Providers and validated by the owner.

The Verifiable Credentials and the DID Documents (Decentralized Identifier), will be used, respectively, as access control means and storage format for the information associated with the object on the blockchain. The former making it possible to provide read access to the information of the object based on the identity of the pair.

In some embodiments, a Zero Knowledge Proof (ZKP) system is established within a Smart Contract, in order to give information without revealing the values thereof.

ZKP is a method which enables an entity to prove to another that a proposition is true without revealing the value thereof. For the purpose of data conservation, this makes it possible to answer a question without revealing the value thereof. For example, a service may ask an object if its temperature is less than or greater than 0° C. without the object having to reveal the value of its temperature. This thus enables optimization of the use of the service, and not in the steps.

Smart Contract is understood as a single and replicated digital protocol/program which makes it possible to perform operations on the blockchain, while complying with well-defined rules.

Thus, all the writes/publications into the blockchain go via Smart Contracts. The access rules are also managed by Smart Contracts.

Various embodiments described also relate to a system for managing secure identities based on a blockchain.

Thus, in some embodiments, a system for managing secure identities based on a blockchain is able to carry out the steps of a process performing:
  The identification of the objects with a list of associated attributes, including in particular security identifiers such as cryptographic keys, and recording thereof in a repository of the Manufacturer;
  The transfer of ownership and/or operating rights of an object from a Manufacturer to a user of the object, for example a service provider using the object, by recording new identities associated with the object;
  The transfer of ownership and/or operating rights of an object from one user to another, by recording new identities associated with the object;
  The updating of attributes associated with the identity of the object by the owner of an object and/or the entity in charge of its operating rights.

Thus, a secure, decentralized, automated and multi-stakeholder platform or system may be established for object identity management through the use of a blockchain technology, enabling secure automated access by objects to digital services and the guarantee of protection of the ensuing exchanges.

Various embodiments described also relate to a database used by the system for managing secure identities based on a blockchain.

Thus, some embodiments relate to a database, used by the system for managing secure identities based on a blockchain, implemented on a secure, decentralized, automated and multi-stakeholder platform for object identity management through the use of blockchain technology implemented on several nodes of the system with which the platform communicates, the nodes being responsible for maintaining the blockchain and enabling the stakeholders (and the objects) to look up the state of this chain and to interact with this chain via a common shared repository (or register), each node having access to a cryptographic module which is preferably physical, in charge of the secure storage of its private key and of the access to the shared register, characterized in that the database constitutes a repository for each manufacturer containing a list of associated attributes, including in particular security identifiers such as cryptographic keys, and either carrying out the recording thereof in the repository of the Manufacturer or carrying out the update of the attributes associated with the identity of the object by the owner of an object and/or the entity in charge of its operating rights.

Various embodiments described also relate to a secure, decentralized, automated and multi-stakeholder platform for object identity management using a decentralized database.

In some embodiments, a secure, decentralized, automated and multi-stakeholder platform for object identity management using a decentralized database manages:

The transfer of ownership and/or operating rights of an object;

The recording of proof of object possession in the shared repository;

The activation/reactivation of objects;

In some embodiments, the blockchain technology used does not have to be of a specific type. In some embodiments, the blockchain technology used comprises at least:

a permission system for identifying and strongly authenticating a stakeholder;

an access control system based on the identities of the users;

an anti-replay mechanism,

Each node maintaining the blockchain having to be located in a secure environment, and the public identity of each node has to be made available to the other nodes and stakeholders within the shared register; the execution of Smart Contract and functions on the blockchain being performed in this secure environment, the ultimate aim of the recording being to create a link, accessible by everyone in the blockchain, in order to make it possible to match the stakeholder and their digital identity by a key pair, public key and private key, or by a certificate, optionally signed by a certified identity management body.

A replay or playback attack is a form of network attack in which a transmission is repeated maliciously by an attacker who intercepted the transmission. This is a type of identity fraud.

In some embodiments, the system comprises at least:

A Manufacturer, using a key diversification system based on diversifiers generated by a diversifier generator, a system for connecting to a blockchain, a system for attributing an identifier to each object leaving manufacturing, and a hardware and software arrangement in order to send, to the blockchain server, a message of publication and of recording of the public client key $Kp_{client}$ and of the association in said database between the DID and the DIV.

The registration, also referred to as personalization, is carried out a single time by the manufacturer. The object updates itself in the steps following manufacture, in this instance in particular when it is bought/handed over.

In some embodiments, the system comprises at least:

An object provided with computation means and means for storing in memory a program and sufficient data to carry out the following operations:

when the object is switched on for the first time, the object enrolls itself according to the following steps:

Generation of an utilization key pair ($Ks_{util}$, $Kp_{util}$), the generation preferably being carried out from an unknown, Auto-enrollment using the manufacturing Key pair by publication, by the object, of its public utilization key ($Kp_{util}$) in an enrollment message, and signing the enrollment message with the private manufacturing key ($Ks_{fab}$)

Replacement, in the blockchain, of the public manufacturing key with the public utilization key The enrollment is made possible since the object has knowledge of the access point of its manufacturer (IP address and/or gateway, etc.) and is in possession of the Kfab key pair (in particular the private key).

In some embodiments, an identity management system of an identity (ID) service provider implements a blockchain and uses the objects recorded on a network to fulfill application services (AS) wherein the information provided by the objects are used, each node of the network of the identity service provider has access to a cryptographic module responsible for the secure storage of the private key of said node, the nodes having clients referred to as Stakeholders, each having their own identity $ID_{act}$ recorded in the blockchain, each object manufacturer is recorded in the blockchain of the identity service provider and the public manufacturing keys of the manufacturers are known to everybody; for each object sold or transferred, each manufacturer provides the identifier of the object and a diversifier used by the manufacturer (DID, DIV) for the calculation of the manufacturing key pairs of each object by the manufacturer, and only the identifier of the object and the public manufacturing key are published in the blockchain, only the private manufacturing key remains stored outside of the chain, in this instance in the object;

Each object being provided with computation means and means for storing in memory a program and sufficient data to execute the following operations: when the object is switched on for the first time, the object enrolls itself with the identity service provider by carrying out the following steps:

Generation, in the object, of an utilization key pair ($Ks_{util}$, $Kp_{util}$), the generation preferably being carried out from an unknown generated by the object itself.

Auto-enrollment using the utilization Key pair by publication, by the object, of its public utilization key ($Kp_{util}$), and signing of the transaction with the private manufacturing key ($Ks_{fab}$)

Replacement of the public manufacturing key with the public utilization key by updating the blockchain.

Alternatively, it would be possible, but less secure, to send the new diversifiers directly to the Smart Contract which encrypts them with the public client key.

In some embodiments, an object is provided with computation means and means for storing in memory a program and sufficient data to carry out the following operations: when the object is switched on for the first time, the object enrolls itself according to the following steps:

Generation of an utilization key pair ($Ks_{util}$, $Kp_{util}$), the generation preferably being carried out from an unknown generated by the object itself.

Auto-enrollment using the manufacturing Key pair by publication, by the object, of its public utilization key ($Kp_{util}$) in an enrollment message, and signing of the enrollment message with the private manufacturing key ($Ks_{fab}$)

Replacement of the public manufacturing key with the public utilization key by updating the blockchain It is understood that, throughout this description, a system is described for automated management of Identities and Accesses through using a blockchain technology.

Figure 1:
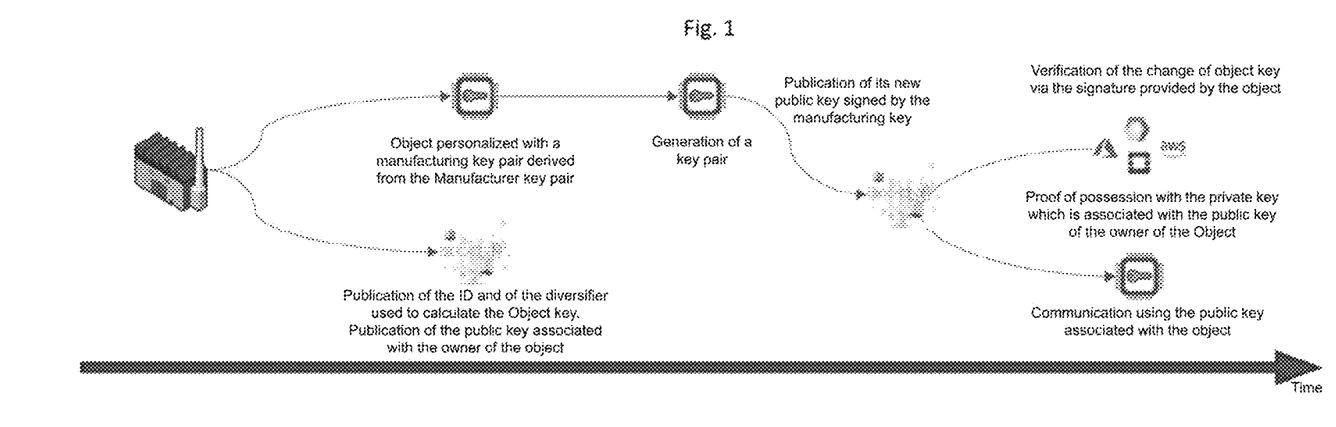
FIG. 1, schematically shows an embodiment of the method.

In some embodiments, and to summarize, the manufacturers are recorded in the Blockchain, and their respective public keys are known to everybody. They manufacture and personalize Objects with manufacturing keys and identifiers. For each object, they publish, in the Blockchain, the identifier and the diversifier used to calculate the manufacturing key. The objects are capable of enrolling themselves and of changing keys by generating their own keys. The changing of key is authorized/validated using the private manufacturing key which is only possessed and used by the object. The service providers may verify, via the Blockchain, that the Object has indeed changed key. This verification of the change signature was only able to be carried out by the object, the only one to know the manufacturing key. FIG. 1 thus illustrates this by way of non-limiting example.

Figure 2:
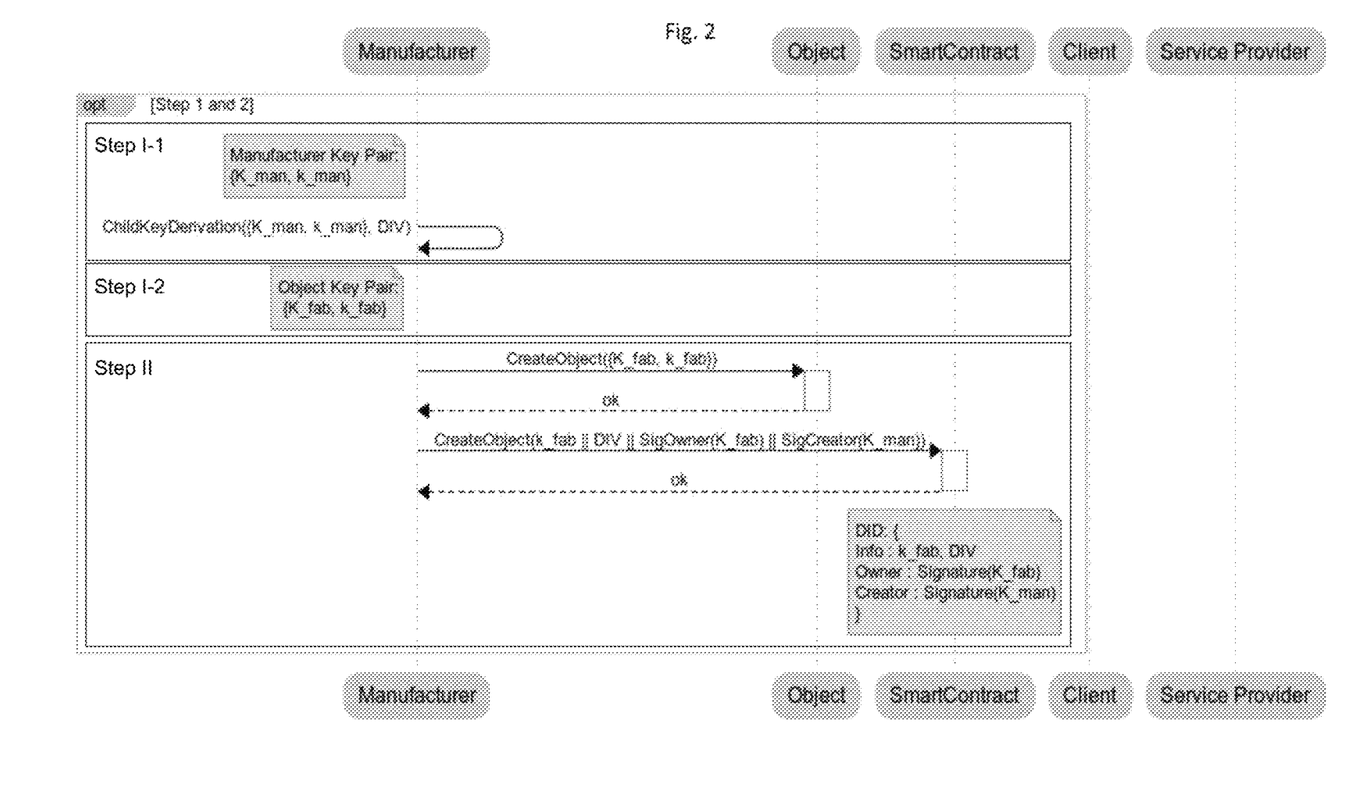
FIG. 2, shows steps a) and b) of the method according to some embodiments.

More particularly, FIG. 2 illustrates an example of a non-limiting embodiment of the present invention, in which steps a) and b) are shown. Step a) relates to the generation of the manufacturing key pair ($Ks_{fab}$, $Kp_{fab}$) obtained via a key derivation function using a diversifier (DIV) from the Manufacturer key pair ($Ks_{man}$, $Kp_{man}$) (Step I-1), and the personalization of the object (the object is aware of the access point of its manufacturer (IP address and/or gateway, etc.) and in possession of the Kfab key pair (Step I-2)). Step b) relates to the publication and recording, in the blockchain, of the DID and of the DIV (Step II). Thus, the script with a double signature makes it possible to differentiate the owner of the object from the one who created the object. This also makes it possible to monitor whether the one who is writing this transaction is indeed the one who created the object.

Figure 3:
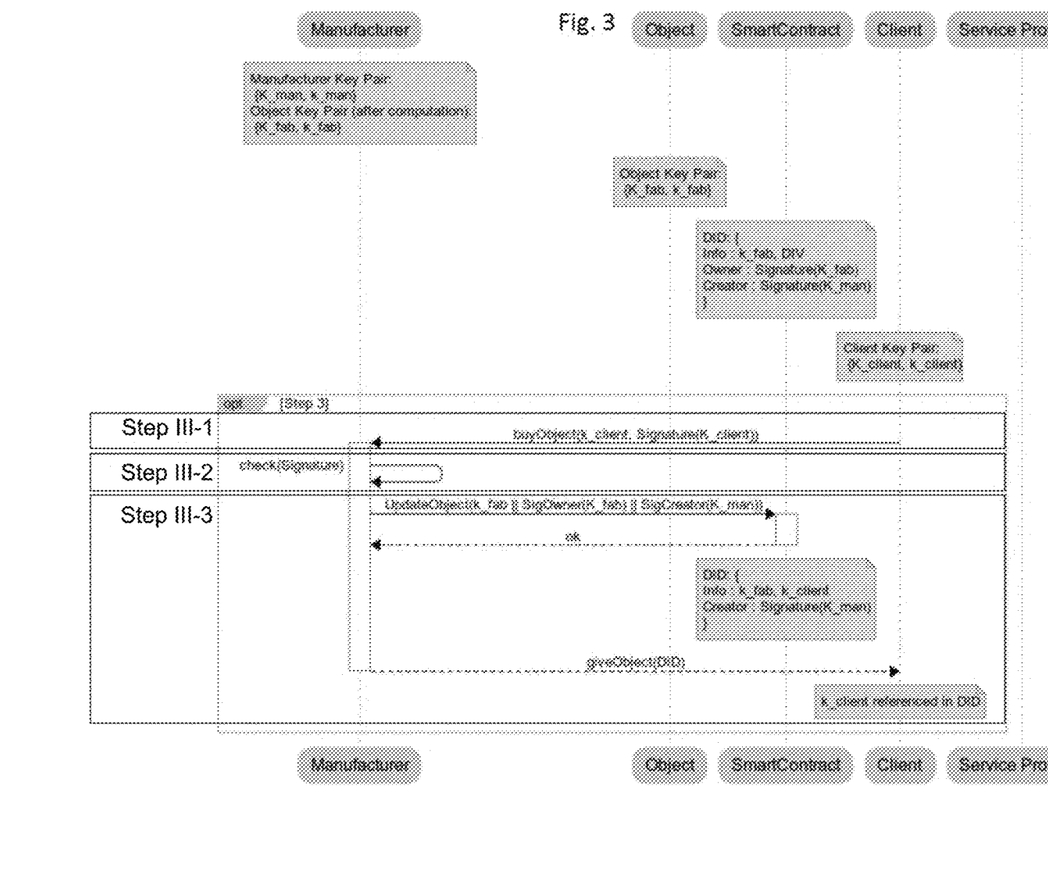
FIG. 3, shows steps c) and d) of the method according to some embodiments.

FIG. 3 illustrates a non-limiting example of an embodiment of the present invention, showing steps c) and d), corresponding to the steps carried out when a Client purchases the object from said Manufacturer (Step III-1). The proof of ownership of the object occurs intrinsically, since the owner is the only one to possess the private key associated with the referenced public key. During the exchange between the Client and the Manufacturer, the client proves that they are indeed the owner of the public key by inserting their signature (Step III-2). The provision of data by the Manufacturer to the client by an "off-chain" mechanism is not shown. The Manufacturer updates the shared repository by publishing the public key associated with the client $Kp_{client}$ and creating the association, in said database, between the DID and the DIV and $Kp_{client}$ (Step III-3).

Figure 4:
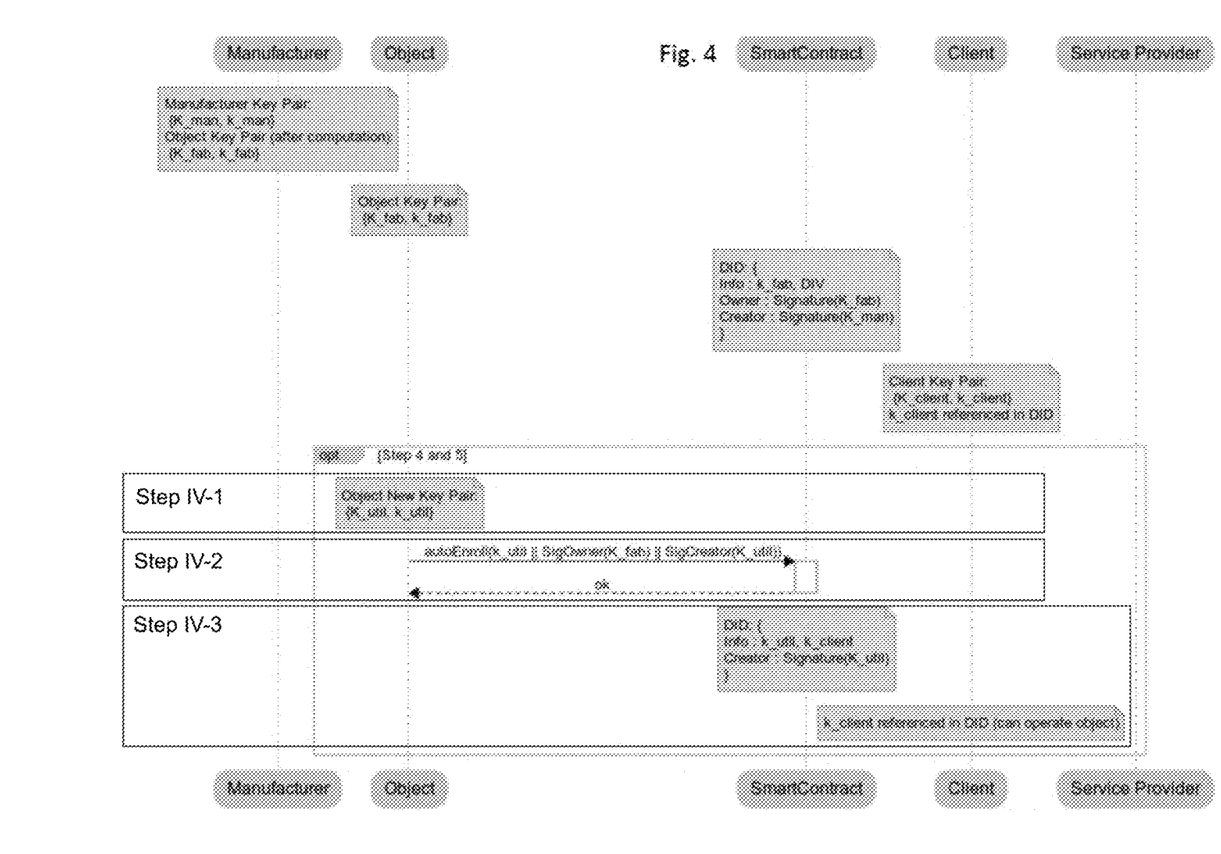
FIG. 4, shows, steps e), f) and g) of the method according to some embodiments.

Finally, FIG. 4 illustrates a non-limiting example of an embodiment of the present invention, wherein steps e), f) and g) corresponding to the steps carried out when the object is switched on for the first time and enrolls itself are shown. Indeed, once it is switched on, the object generates an utilization key pair (Step IV-1). The object subsequently enrolls itself by publishing its public utilization key ($Kp_{util}$) in an enrollment message (Step IV-2), the enrollment message being signed with the private manufacturing key ($Ks_{fab}$) which only the Object possesses. Finally, the publication (Step IV-3), to update the blockchain, of the public utilization key associated with the DID of the object (and therefore replacement of the public manufacturing key associated with the DID of the object with said public utilization key).

The system thus comprises a secure identity manager based on a blockchain in which the identities, or the processes making it possible to find these identities, are published. The nodes of the shared register thus maintain a blockchain and, by extrapolation, the identity manager.

It will be readily apparent from reading the present application that the particular features of the present invention, as generally described and illustrated in the figures, can be arranged and designed in a wide variety of different configurations. Thus, the description of the present invention and the figures relating thereto are not intended to limit the scope of the invention but merely represent selected embodiments.

A person skilled in the art will understand that the technical features of a given embodiment may in fact be combined with features of another embodiment unless the opposite is explicitly mentioned or it is not obvious that these features are incompatible. In addition, the technical features described in a given embodiment may be isolated from the other features of this mode unless the opposite is explicitly stated.

It must be obvious to those skilled in the art that the present invention enables embodiments in numerous other specific forms without departing from the field defined by the scope of the appended claims; they must be considered as illustrative and the invention must not be limited to the details given above.

What is claimed is:

1. A communication method for secure management of keys and identities of an object manufactured by a manufacturer having a manufacturer key pair of a public manufacturer key, and a private manufacturer key or a secret manufacturer key, and a client having a client key pair comprising a public client key and a secret client key, wherein the secure management is carried out at least partially on a decentralized blockchain database, and wherein the communication method comprises:

generating, by the manufacturer, of a manufacturing key pair obtained via a key derivation function, the manufacturing key pair being recorded in the object, and composed of a private manufacturing key resulting from a derivation of the private manufacturer key with a diversifier, and of a public manufacturing key, complementary to said private manufacturing key, the public manufacturing key resulting from the derivation of the public manufacturer key with the diversifier;

publication and recording, in the decentralized blockchain database, of a decentralized identifier of the object and the diversifier used to obtain the public manufacturing key of the object in association;

and, when the client purchases the object from said manufacturer, the communication method further comprising providing, by the manufacturer of the object, of the decentralized identifier of the object, and of the public manufacturing key to the client;

updating the decentralized blockchain database by publication of the public client key and creation of the association, in said decentralized blockchain database, between the decentralized identifier of the object and the diversifier and the public client key;

and, when the object is switched on for a first time, the object enrolls itself according to generation of a utilization key pair;

auto-enrollment using the manufacturing key pair by publication, by the object, of a public utilization key of the object in an enrollment message, and signing of the enrollment message with the private manufacturing key; and replacement, in the decentralized blockchain database, of the public manufacturing key associated with the decentralized identifier of the object of with the public utilization key associated with the decentralized identifier of the object.

2. The communication method according to claim 1, wherein the generating of the manufacturing key pair is based on hierarchical key wallets to provide unique manufacturing key pairs which are diversified from the manufacturer key pair.

3. The communication method according to claim 1, wherein the object is transferred from an owner to another owner by reiterating said updating, said generation of said utilization key pair said auto-enrollment using said manufacturing key pair, and said replacement.

4. The communication method according to claim 1, further comprising, prior to the generation of the manufacturing key pair by the manufacturer, recording, by said manufacturer, their manufacturer identifier in the decentralized blockchain database and publishing their public manufacturer key by associating said public manufacturer key with the manufacturer identifier.

5. The communication method according to claim 1, wherein sharing or managing rights to the object is performed by an owner of the object by means of verifiable credentials.

6. The communication method according to claim 1, wherein a Zero Knowledge Proof (ZKP) system is established within a smart contract, in order to give information without revealing values thereof.

7. The communication method according to claim 1, further comprising:
an identification of objects with a list of associated attributes, including security identifiers comprising cryptographic keys, and recording thereof in a repository of a manufacturer;
a transfer of one or more of ownership and operating rights of an object from the manufacturer to a user of the object, comprising a service provider using the object, by recording new identities associated with the object;
a transfer of one or more of said ownership and said operating rights from said user to another user, by said recording said new identities associated with the object;
updating of said attributes associated with an identity of the object by one or more of an owner of the object and an entity in charge of operating rights of said object and said entity.

8. A system for managing secure identities based on a blockchain and able to carry out a communication method, for secure management of keys and identities of an object manufactured by a manufacturer having a manufacturer key pair of a public manufacturer key, and a private manufacturer key or a secret manufacturer key, and a client having a client key pair comprising a public client key and a secret client key, wherein the secure management is carried out at least partially on a decentralized blockchain database, and wherein the communication method comprising
generating, by the manufacturer, of a manufacturing key pair obtained via a key derivation function, the manufacturing key pair being recorded in the object, and composed of a private manufacturing key resulting from a derivation of the private manufacturer key with a diversifier, and of a public manufacturing key, complementary to said private manufacturing key, the public manufacturing key resulting from the derivation of the public manufacturer key with the diversifier;
publication and recording, in the decentralized blockchain database, of a decentralized identifier of the object and of the diversifier used to obtain the public manufacturing key of the object in association;
and, when the client purchases the object from said manufacturer, the communication method further comprising
providing, by the manufacturer of the object, of the decentralized identifier of the object, and of the public manufacturing key to the client;
updating the decentralized blockchain database by publication of the public client key and creation of the association, in said decentralized blockchain database, between the decentralized identifier of the object and the diversifier and the public client key;
and, when the object is switched on for a first time, the object enrolls itself according to generation of a utilization key pair;
auto-enrollment using the manufacturing key pair by publication, by the object, of a public utilization key in an enrollment message, and signing of the enrollment message with the private manufacturing key; and
replacement, in the decentralized blockchain database, of the public manufacturing key associated with the decentralized identifier of the object with the public utilization key associated with the decentralized identifier of the object,
the system comprising:
a manufacturer, using a key diversification system based on diversifiers generated by a diversifier generator,
a system for connecting to a blockchain,
a system for attributing an identifier to each object leaving manufacturing, and
a hardware and software arrangement in order to send, to a blockchain server, a message of publication and of recording of the public client key and of the association in said decentralized blockchain database between the decentralized identifier and the diversifier.

9. The system according to claim 8, further comprising:
the object provided with computation means and means for storing in memory a program and sufficient data to carry out
said generation;
said auto-enrollment; and
said replacement.

10. An identity management system of an identity service provider, implementing a blockchain and using objects recorded on a network to fulfill application services wherein information provided by the objects are used, wherein each node of a plurality of nodes of the network of the identity service provider has access to a cryptographic module responsible for secure storage of a private key of said each node, wherein the plurality of nodes having comprise clients comprising stakeholders, each client of said clients comprising their own identity recorded in the blockchain, wherein each object manufacturer of manufacturers is recorded in the blockchain of the identity service provider and public manufacturing keys of the manufacturers are known to everybody; for each object sold or transferred of said objects, said each object manufacturer provides an identifier of the each object and a diversifier used by the each object manufacturer comprising a decentralized identifier of the object and the diversifier, and a for a calculation of manufacturing key pairs of said each object by the each object manufacturer, and wherein only the identifier of the object and the public manufacturing key are published in the blockchain, wherein only the private key remains stored outside of the blockchain, in the each object;

wherein said each object being provided with computation means and means for storing in memory a program and sufficient data to execute a process comprising:

when the client purchases the each object from said manufacturer, the process further comprises providing, by the manufacturer of the each object, of the decentralized identifier of the each object, and of the public manufacturing key to the client;

updating the blockchain by publication of the public client key and creation of an association, in said blockchain, between the decentralized identifier of the each object and the diversifier and the public client key;

when the each object is switched on for a first time, the each object enrolls itself with the identity service provider according to generation, in the each object, of a utilization key pair;

auto-enrollment using the utilization key pair by publication, by the each object, of a public utilization key, and signing of a transaction with the private key; and replacement of the public manufacturing key with the public utilization key by updating the blockchain;

wherein the each object is transferred from an owner to another owner by reiterating said updating, said generation of said utilization key pair said auto-enrollment using said manufacturing key pair, and said replacement.

11. The communication method of claim 1, wherein the providing is performed by a mechanism outside of the decentralized blockchain database, comprising an off-chain mechanism.

12. The communication method of claim 5, wherein the sharing or the managing rights to the object is performed by the owner of the object by means of the verifiable credentials requested by service providers and validated by the owner.

13. The system for managing secure identities based on a blockchain according to claim 8, further comprising:

said decentralized blockchain database implemented on a secure, decentralized, automated and multi-stakeholder platform for object identity management through use of blockchain technology implemented on several nodes of the system with which the secure, decentralized, automated and multi-stakeholder platform communicates, the several nodes being responsible for maintaining the blockchain and enabling stakeholders and said object to look up a state of said blockchain and to interact with said blockchain via a common shared repository or shared register, each node of said several nodes having access to a cryptographic module, in charge of a secure storage of a private key and of access to the shared register, wherein the decentralized blockchain database comprises said common shared repository for each manufacturer containing a list of associated attributes, including security identifiers, and either carrying out recording thereof in said common shared repository of the manufacturer or carrying out an update of the associated attributes associated with an identity of the object by one or more of an owner of the object and an entity in charge of operating rights.

14. The system for managing secure identities based on a blockchain according to claim 13, wherein the secure, decentralized, automated and multi-stakeholder platform manages one or more of a transfer of ownership and the operating rights of the object;

a recording of proof of object possession in the common shared repository; and an activation and reactivation of the object.

15. The system for managing secure identities based on a blockchain according to claim 14, wherein the blockchain technology used does not have to be of a specific type and comprises at least a permission system for identifying and strongly authenticating a stakeholder;

an access control system based on identities of users;

an anti-replay mechanism, wherein each node maintains the blockchain technology having to be located in a secure environment, and a public identity of said each node has to be made available to other nodes and the stakeholders within the shared register;

wherein execution of smart contacts and functions on the blockchain technology being performed in the secure environment, wherein an aim of the recording being to create a link, accessible by everyone in the blockchain technology, in order to make it possible to match the stakeholder and their digital identity by a key pair comprising a public key and a private key, or by a certificate.

* * * * *